(12) United States Patent
Collier

(10) Patent No.: US 11,037,431 B1
(45) Date of Patent: Jun. 15, 2021

(54) PROXIMITY SAFETY APPARATUS

(71) Applicant: Michael Andrew Collier, Glendale, AZ (US)

(72) Inventor: Michael Andrew Collier, Glendale, AZ (US)

( * ) Notice: Subject to any disclaimer, the term of this patent is extended or adjusted under 35 U.S.C. 154(b) by 0 days.

(21) Appl. No.: 16/863,916

(22) Filed: Apr. 30, 2020

(51) Int. Cl.
| | |
|---|---|
| *G08B 23/00* | (2006.01) |
| *G08B 21/22* | (2006.01) |
| *G08B 25/01* | (2006.01) |
| *G08B 25/10* | (2006.01) |
| *H04W 4/90* | (2018.01) |
| *H04W 4/02* | (2018.01) |
| *H04W 4/021* | (2018.01) |
| *H04W 4/029* | (2018.01) |
| *G08B 21/02* | (2006.01) |

(52) U.S. Cl.
CPC .............. *G08B 21/22* (2013.01); *G08B 21/02* (2013.01); *G08B 25/016* (2013.01); *G08B 25/10* (2013.01); *H04W 4/021* (2013.01); *H04W 4/023* (2013.01); *H04W 4/029* (2018.02); *H04W 4/90* (2018.02)

(58) Field of Classification Search
CPC ....................................................... G08B 21/22
USPC ...... 340/573.4, 573.1, 539.13, 539.32, 426.6
See application file for complete search history.

(56) References Cited

U.S. PATENT DOCUMENTS

| | | | | |
|---|---|---|---|---|
| 6,014,080 | A * | 1/2000 | Layson, Jr. ........ | G08B 21/0211 340/539.1 |
| 7,289,031 | B1* | 10/2007 | Hock ..................... | G08B 21/22 340/539.13 |
| 2007/0139207 | A1* | 6/2007 | Agapi ................ | G08B 21/0269 340/573.4 |
| 2013/0328678 | A1* | 12/2013 | Shechter ................ | G08B 21/22 340/539.13 |
| 2014/0191864 | A1* | 7/2014 | Ghazarian .............. | G08B 21/22 340/539.13 |
| 2017/0162031 | A1* | 6/2017 | Drolshagen ............ | A61B 5/117 |

* cited by examiner

*Primary Examiner* — Tai T Nguyen
(74) *Attorney, Agent, or Firm* — Parsons & Goltry; Robert Parsons; Michael Goltry

(57) ABSTRACT

Safety apparatus including a first electronic monitoring device designed to be locked onto the wrist of a threatening individual and a second electronic monitoring device designed to be possessed by a victim. Both the electronic monitoring devices including GPS apparatus designed to provide GPS information as to the geographic position of the electronic monitoring bracelet. A remote monitoring station is electronically coupled to receive GPS information from both electronic monitoring devices. The remote monitoring station is designed to determine the geographic position of the first electronic monitoring device relative to the geographic position of the second electronic monitoring device and to provide appropriate proximity alerts to one or both individuals.

2 Claims, 2 Drawing Sheets

PROXIMITY SAFETY APPARATUS

FIELD OF THE INVENTION

This invention relates to safety apparatus providing a warning of potential danger or the proximity of danger.

BACKGROUND OF THE INVENTION

In many instances courts place restraining orders on individuals who threaten, harass or otherwise are a potential danger to the safety of other individuals or even groups or organizations (e.g. schools, businesses, etc.). However, while restraining orders are intended to stop and theoretically do stop the threatening individual from approaching or entering the area of the threatened individual, there is no guarantee that they will not break the restraining order. When breach of a restraining order occurs, the current recourse is for the threatened individual, business or organization to call law enforcement to confront or detain the threatening individual. Often, the consequences of a breach of a restraining order are undesirable and a call to the police cannot be made or is made untimely. Additionally, restraining orders include a specific distance within which the threatening individual may not approach. Often, nothing can be done to an individual hovering outside this specified distance. The threatened individual, business or organization may not even be aware of this shadowing or that the threatening individual is close, and therefore, cannot take appropriate steps.

While a restraining order is typically to protect a threatened individual, business or organization, it should also protect the threatening individual. There are instances of the threatening individual being confronted by the threatened individual. Currently, if this occurs, the threatened individual is assumed at fault.

It would be highly advantageous, therefore, to remedy this and other deficiencies inherent in the prior art.

Accordingly, it is an object of the present invention to provide new and improved safety apparatus for providing a proximity alert.

It is another object of the present invention to provide new and improved safety apparatus for providing a proximity alert to threatened individuals so they can take protective and/or avoidance steps when threatening individuals approach.

SUMMARY OF THE INVENTION

Briefly to achieve the desired objects and advantages of the instant invention, safety apparatus is provided for use in conjunction with court dictated restraining orders. The safety apparatus includes a first electronic monitoring device designed to be locked onto a threatening individual and a second electronic monitoring device designed to be possessed by a victim. Both the first electronic monitoring device and the second electronic monitoring device include GPS apparatus designed to provide GPS information as to the geographic position of the first and second electronic monitoring devices, respectively. Whereby the geographic position of the first electronic monitoring device relative to the geographic position of the second electronic monitoring device is determined by a remote monitoring station.

The desired objects and advantages of the instant invention are further achieved in a preferred example of safety apparatus for providing a proximity alert. The safety apparatus includes a first electronic monitoring bracelet designed to be locked onto the wrist of a threatening individual and a second electronic monitoring bracelet designed to be worn on the wrist of a victim. Both the first and second electronic monitoring bracelets include GPS apparatus designed to provide GPS information as to the geographic position of the first electronic monitoring bracelet and the second electronic monitoring bracelet, respectively. A remote monitoring station is electronically coupled to receive the GPS information from both the first electronic monitoring bracelet and the second electronic monitoring bracelet. The remote monitoring station is designed to determine the geographic position of the first electronic monitoring bracelet relative to the geographic position of the second electronic monitoring bracelet.

The desired objects and advantages of the instant invention are further achieved in a preferred example of a method of providing a proximity signal or notification to a victim being protected when a threatening individual approaches. The method includes the steps of providing safety apparatus including a first electronic monitoring device locked onto the threatening individual and a second electronic monitoring device possessed by the victim. Both the first electronic monitoring device and the second electronic monitoring device include GPS apparatus providing GPS information as to the geographic position of the first electronic monitoring device and the second electronic monitoring device, respectively. A remote monitoring station is electronically coupled to receive the GPS information from both the first electronic monitoring device and the second electronic monitoring device. The remote monitoring station determines the geographic position of the first electronic monitoring device relative to the geographic position of the second electronic monitoring device. The method further includes the step of notifying one of the threatening individual, the threatened individual, and the police when a preset distance between the threatening individual and the victim is breached.

BRIEF DESCRIPTION OF THE DRAWINGS

Specific objects and advantages of the invention will become readily apparent to those skilled in the art from the following detailed description of a preferred example thereof, taken in conjunction with the drawings in which.

DETAILED DESCRIPTION OF THE DRAWINGS

Figure 1:
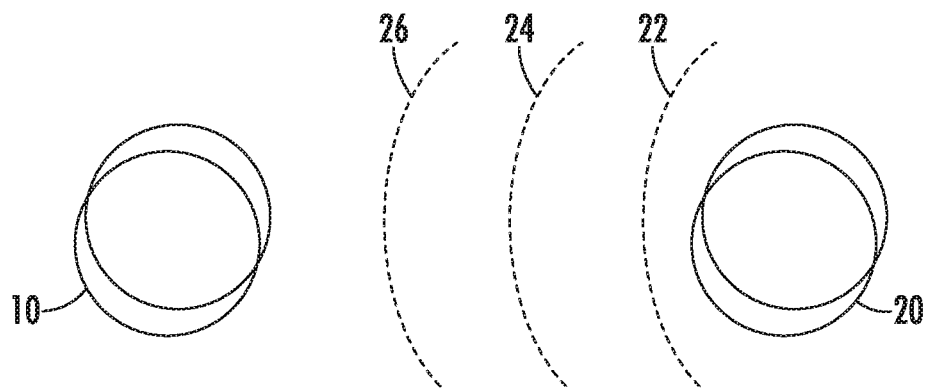
FIG. 1 illustrates a scenario for typical court ordered restraining orders on individuals who threaten, harass or otherwise are a potential danger to the safety of other individuals.

Turning to FIG. 1, an example of a scenario for court ordered restraining orders on individuals who threaten, harass or otherwise are a potential danger to the safety of other individuals, organizations or buildings is illustrated. In this example, an electronic monitoring bracelet 10 is illustrated, to be locked onto a culprit (threatening or harassing person), and a second monitoring device 20, to be possessed by the victim (threatened individuals, organizations or buildings). Bracelet 10 is a device that is secured to the culprit, such as currently used ankle monitors are secured, to prevent removal and if removed without authorization to sound an alarm or give other notice to relevant authorities that bracelet 10 has been removed. It will be understood that second monitoring device 20 need not be secured, and thus can take various different forms as desired, such as a bracelet to be worn by an individual, or other form provided to an organization or building if, for example a business or building has been threatened. In the case of a business or building, second monitoring device 20 is a device to be accepted by security personnel and the like. For purposes of monitoring the culprit's physical position, bracelet 10 includes GPS apparatus. Device 20 also includes GPS apparatus for the purpose of monitoring the culprit's and the victim's relative positions.

A first perimeter 22 is an outer boundary of a violation area defined by a distance from the victim or building. This distance is typically set by court order and is a distance to the victim or building the culprit is not supposed to enter. If the culprit enters perimeter 22 an alarm will be sent to the police designating this infraction, and the police will be directed to immediately go and arrest the culprit for a restraining order violation. The victim will also be given warning that the culprit is in the violation area. A second perimeter 24 is an outer boundary of a warning area defined by a distance from the victim which is greater than the specific distance for the restraining order. The warning area includes the area between second perimeter 24 and first perimeter 22. If the culprit enters second perimeter 24 into the warning area, a warning can be given to the victim that the culprit is nearby. For businesses and building, this will give security a chance to be prepared. If the victim is an individual, the police or other authority can advise a direction to travel to avoid the culprit. Additionally, another warning is sent to the to the police or other authority. The culprit will then be advised that he is within a warning area and must leave. They can give him advise on a direction to proceed if the victim is an individual and also moving. A third perimeter 26 is an outer boundary of a notification area defined by a distance from the victim which is greater than second perimeter 24. The notification area includes the area between third perimeter 26 and second perimeter 24. If the culprit enters third perimeter 26 into the notification area, notice is given to the culprit that distance to the victim is getting close to the limit set by the restraining order. Direction for increasing the distance can be given at this time, particularly if the victim is an individual who is also on the move. In this manner, chance meeting between the culprit and the victim can be avoided, particularly in cases where the victim is an individual who is moving.

Figure 2:
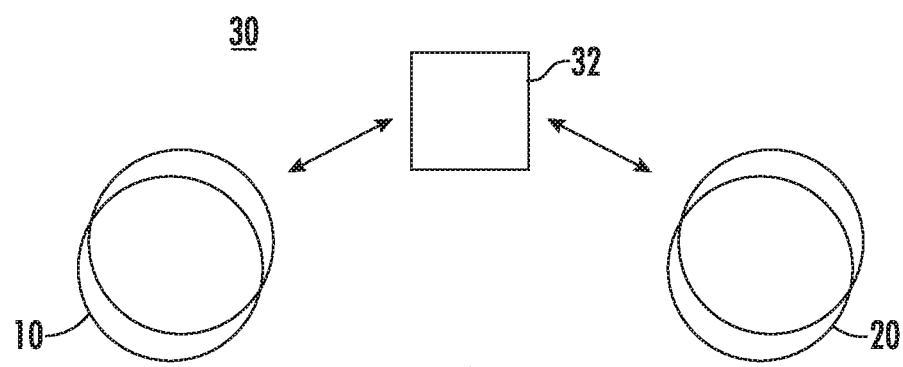
FIG. 2 is a perspective view of a simplified example of safety apparatus for providing a proximity alert to threatened individuals, in accordance with the present invention.

Turning to FIG. 2, a perspective view of a simplified example of safety apparatus, designated 30, for providing a proximity alert to threatened individuals, victims, in accordance with the present invention is illustrated. In this example, first electronic monitoring bracelet 10, to be locked onto the culprit, and second electronic monitoring device 20, to be possessed by the victim, are illustrated. In this example, a remote monitoring station 32 is situated to communicate with both bracelet 10 and device 20, either continuously or within short intervals. Also, in this example both bracelet 10 and device 20 are designed to provide GPS information to monitoring station 32 either continuously or at short intervals. For purposes of this simplified example, monitoring station 32 can be a service set up specifically for the purpose of monitoring individuals or it can simply be a centrally located computer or the like programmed to provide the desired functions.

Through the GPS information, monitoring station 32 continuously knows the physical position of both the culprit and the victim at all times. In a simple example of the operation of safety apparatus 30, if or when the culprit breaches perimeter 26 into the notification area, monitoring station 32 sends a message to the culprit advising him that he must move in a certain direction to get out of the proscribed area. If the culprit moves in conformance with the message, no further communications are necessary. If the culprit continues to move toward the victim and breaches second perimeter 24 into the warning area, monitoring station 32 notifies the police as well as the culprit. Various actions can be taken, but generally they include the police or the monitoring station warning the culprit off. If the culprit continues and breaches third perimeter 26 into the violation area, the police will be advised and will arrest the culprit for violation of the court order. Also, the victim will be notified immediately of the breach and, if an individual, will be advised of a direction to travel to avoid the culprit, or, if the victim is a business or building, security or other designated person will be alerted.

It should be noted that cases in which the victim actually approached the culprit for nefarious purposes have been recorded. Such examples can also be prevented with the present safety apparatus 30. Because both the culprit and the victim are wearing monitoring bracelets, monitoring station 32 can quickly determine the movements of both parties. In the event the victim is moving into or towards the culprit's area, monitoring station 32 can quickly assess the situation and take steps (e.g. reverse the steps described above) to assure the safety of the culprit.

Figure 3:
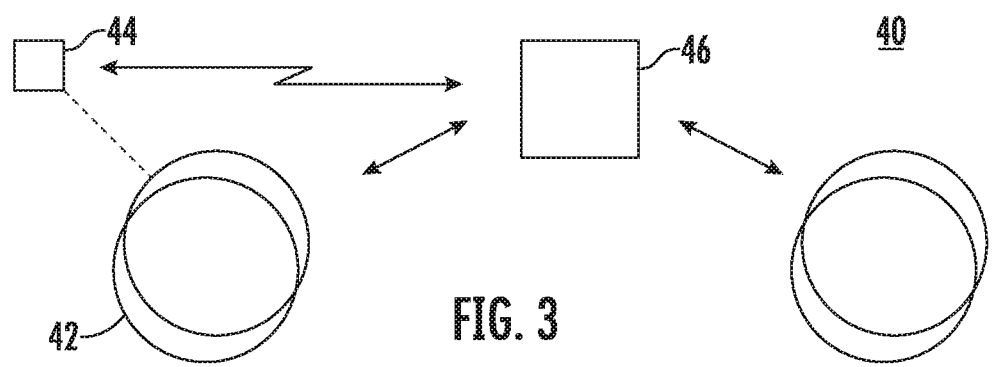
FIG. 3 is a perspective view of another example of safety apparatus including a visual monitor.

It is understood that bracelet 10 is fixed on the culprit's wrist and cannot be easily removed. However, to provide additional assurance that the culprit is being monitored, an embodiment of safety apparatus, designated 40, is illustrated in FIG. 3. In the embodiment of FIG. 3, a bracelet 42 includes a camera 44. Camera 44, either through a transmission from bracelet 42 or an interrogation of bracelet 42 from a monitoring station 46, allows monitoring station 46 to view the culprit's face to ensure that bracelet 42 has not been removed or exchanged with a different person. Monitoring of the culprit's face can be performed, for example, when a perimeter is breached or when any other suspicious actions occur. The monitoring service can request visual identification of the culprit during the warning.

Figure 4:
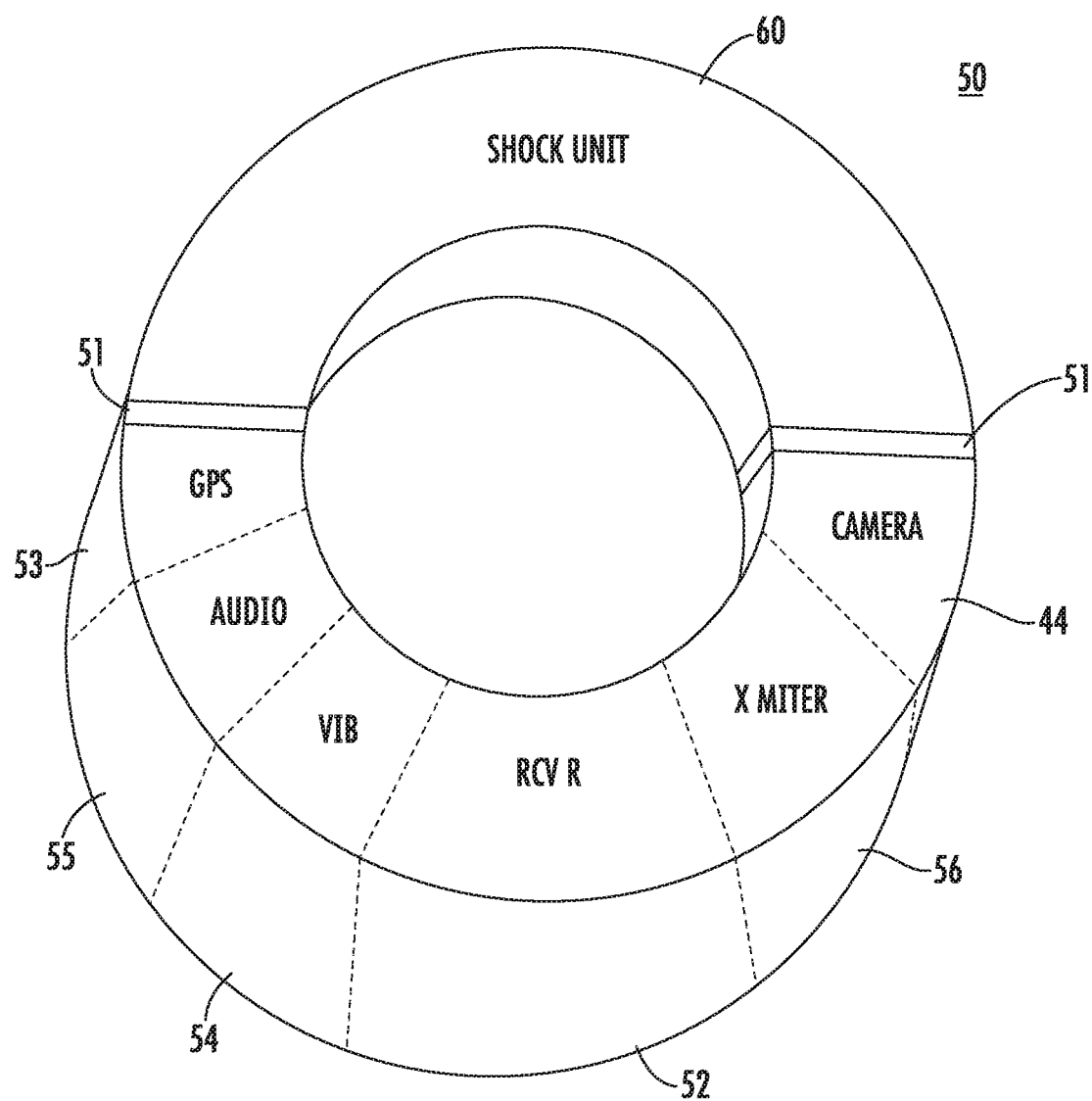
FIG. 4 is another example of safety apparatus for providing a proximity alert to threatened individuals, in accordance with the present invention.

Referring specifically to FIG. 4, a bracelet 50 is illustrated that includes any or all of various electronic components, such as those described in conjunction with bracelets 10 and 42. Bracelet 50 includes hinges/locking mechanism 51 which allow bracelet 50 to be locked around a wrist and removable only with special tools or keys for bracelet 10. Bracelet 50 includes a receiver 52 tuned to receive transmitted signals from a monitoring station, such as 32 or 46. Receiver 52 can be coupled to a notification device, such as a vibrator 54 or an audio signaling device 55. Bracelet 50 includes a GPS device 53 that provides GPS information to monitoring station 32, generally by way of a transmitter 56. Also, transmitter 56 can be included in bracelet 50 to allow the culprit to communicate with monitoring station 32 or 46 or in some instances the police. It will be understood by those of ordinary skill in the art that each or all of the components 52, 54, 55, 56 and camera 44 can be produced in semiconductor chip form (one or more combined in a single chip) and the semiconductor chip or chips can be integrated into a conveniently sized bracelet. A specialized function can be added to help disable a culprit if necessary, specifically for building intrusions. Specifically, a shock unit 60 can be carried by the bracelet 50. Shock unit 60 is functionally equivalent to a taser device and can disable the culprit or the arm to which it is attached when activated. Use of shock unit 60 would be warranted in situations wherein the culprit enters a building or accosts a person and threatens violence. In this instance the authorities such as the police can uses this feature to disable the culprit until apprehended.

It should also be understood that device 20 or 40, possessed by the victim, can include any or all of the components described in conjunction with bracelet 50 of FIG. 4. Further, either device 20 or 40 can include any or all of the components produced in semiconductor chip form (one or more combined in a single chip) and the semiconductor chip or chips can be integrated into a conveniently sized bracelet or other form as required. For example, the victim's monitoring device 20 or 40 can be included in a wristwatch assembly or the like that can include other uses and that will be unidentifiable as a component of safety apparatus 30 or 40.

Thus, the present invention discloses and provides new and improved safety apparatus for providing a proximity alert. The new and improved safety apparatus provides a proximity signal or notification so that individuals being protected can take protective and/or avoidance steps when threatening individuals approach. The safety apparatus includes a bracelet locked onto a threatening individual and further includes a bracelet worn by the threatened individual so that breach of court ordered restraining orders can be immediately determined and steps taken to ensure the safety of both the threatened individual and the threatening individual.

Various changes and modifications to the examples herein chosen for purposes of illustration will readily occur to those skilled in the art. To the extent that such modifications and variations do not depart from the spirit of the invention, they are intended to be included within the scope thereof which is assessed only by a fair interpretation of the following claims.

Having fully described the invention in such clear and concise terms as to enable those skilled in the art to understand and practice the same,

The invention claimed is:

1. A method of providing a proximity signal or notification to a threatened individual being protected when a threatening individual approaches, the method including steps of:

providing safety apparatus including:
  a first electronic monitoring bracelet locked onto a wrist of the threatening individual, the first electronic monitoring bracelet including GPS apparatus providing GPS information as to a geographic position of the first electronic monitoring bracelet;
  a second electronic monitoring bracelet worn on the wrist of the threatened individual, the second electronic monitoring bracelet including GPS apparatus providing GPS information as to a geographic position of the second electronic monitoring bracelet; and
  a remote monitoring station electronically coupled to receive the GPS information from both the first electronic monitoring bracelet and the second electronic monitoring bracelet, the remote monitoring station determining the geographic position of the first electronic monitoring bracelet relative to the geographic position of the second electronic monitoring bracelet; and notifying one of the threatening individual, the threatened individual, and a police when a distance between the threatening individual and the threatened individual is breached, including the steps of the remote monitoring station notifying the threatening individual when a distance between the threatening individual and the threatened individual is less than a first preset amount and advising as to a direction to travel to increase the distance, notifying the police when a distance between the threatening individual and the threatened individual is less than a second preset amount, and notifying the threatened individual when a distance between the threatening individual and the threatened individual is less than a third preset amount.

2. The method as claimed in claim 1 wherein the first preset amount, the second preset amount, and the third preset amount are defined by three concentric circles, an outer circle with a radius defining the first preset amount, an intermediate circle with a radius defining the second preset amount, and an inner circle with a radius defining the third preset amount.

* * * * *